United States Patent
Rabii

Patent Number: 5,717,861
Date of Patent: Feb. 10, 1998

[54] METHOD AND SYSTEM FOR DETERMINING NETWORK ACCESS DELAY

[75] Inventor: Khosro Marcus Rabii, Hawthorn Woods, Ill.

[73] Assignee: Zenith Electronics Corporation, Glenview, Ill.

[21] Appl. No.: 575,802

[22] Filed: Dec. 21, 1995

[51] Int. Cl.[6] .................................................. G06F 13/00
[52] U.S. Cl. ........................... 395/200.13; 395/200.11
[58] Field of Search .......................... 395/200.02, 200.11, 395/200.13, 200.14, 200.19, 200.54, 200.63, 200.64, 200.78

[56] References Cited

U.S. PATENT DOCUMENTS

| | | | |
|---|---|---|---|
| 4,411,007 | 10/1983 | Rodman | 375/107 |
| 4,500,989 | 2/1985 | Dahod | 370/85 |
| 4,688,213 | 8/1987 | Raychaudhuri | 370/93 |
| 4,757,460 | 7/1988 | Bione et al. | 364/514 |
| 4,757,521 | 7/1988 | Korsky | 375/109 |
| 4,860,287 | 8/1989 | Kelly | 370/108 |
| 4,868,522 | 9/1989 | Popat | 331/2 |
| 4,873,703 | 10/1989 | Crandall | 375/118 |
| 5,550,807 | 8/1996 | Kuroshita | 370/17 |

*Primary Examiner*—Eric Coleman

[57] ABSTRACT

A method and apparatus for determining network access delays in a communications network is disclosed. The communications network has a plurality of stations interconnected in a communications network. An access delay interval determining means determines a network access delay for each of the plurality of stations. That is, a time interval between a station predetermined sequence of symbols received from each of the stations and a local predetermined sequence of symbols is determined based upon a point of predetermined correlation between the station predetermined sequence of symbols and the local predetermined sequence of symbols. The time interval is used in determining the network access delay for each of the stations. The stations transmit data packets at times based upon their corresponding network access delay.

40 Claims, 6 Drawing Sheets

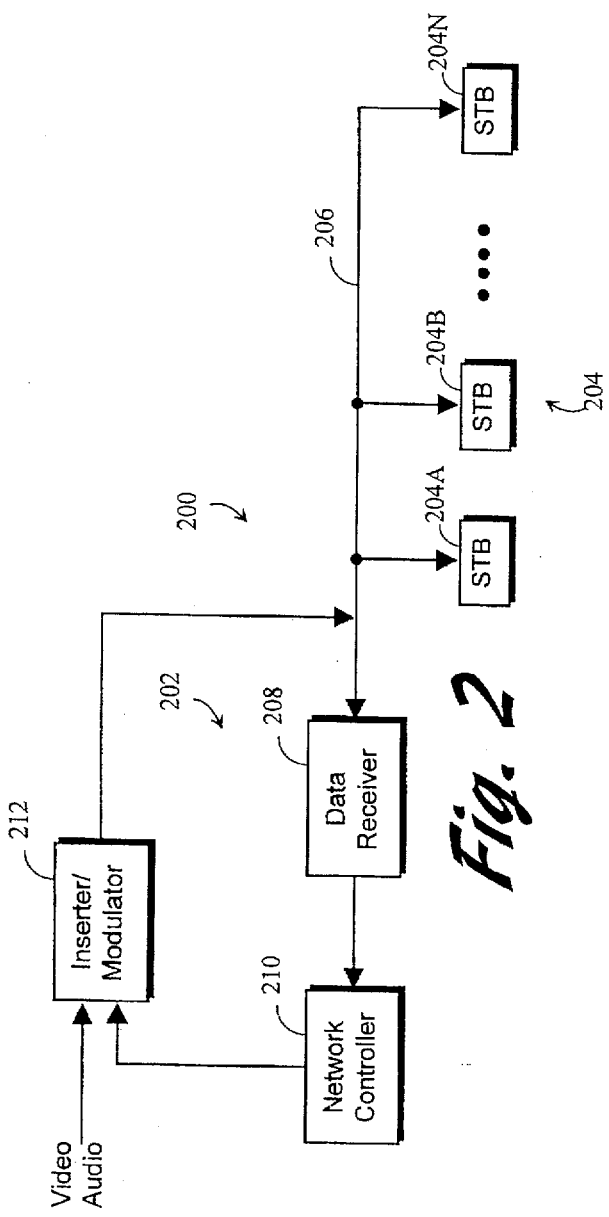
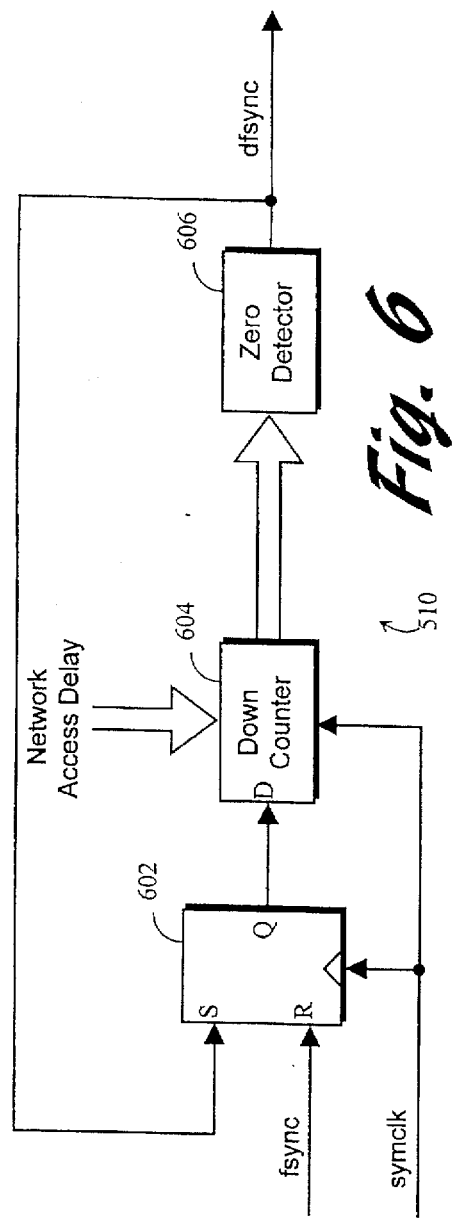

METHOD AND SYSTEM FOR DETERMINING NETWORK ACCESS DELAY

FIELD OF THE INVENTION

The present invention relates to a method and apparatus for determining network access delays.

BACKGROUND OF THE INVENTION

Data communication systems typically include a plurality of stations which are arranged to communicate with one another over a common bi-directional communication medium. The stations may be located remote from one another and may include a central station and a plurality of other stations. The stations may communicate with one another electromagnetically, sonically, or otherwise through air or space, a coaxial cable, a twisted pair of conductors, a fiber optic cable, or the like.

One example of a data communication system is a cable television system. A cable television system includes a central station which is usually referred to as a "headend" and provides program content to a large number of end user stations generally referred to as subscriber terminals. The headend of the cable television system provides the program content, as well as other information, to the subscriber terminals by way of a multiple branch distribution network which may define several tiers of distribution facilities. The other information provided by the headend may include management and operating data. Communication from the headend to the subscriber terminals is generally referred to as "downstream" communication.

In some cable television systems referred to as one-way cable television systems, all information and data is transferred downstream. In other cable television systems referred to as two-way systems, communication is also provided from the various subscriber terminals through the network to the headend in what is referred to as "upstream" communication. Examples of subscriber terminal originated upstream information may include program purchasing requests, opinion poll responses, and subscriber terminal status information.

In a cable television system connected over a network of the type described above, it will be appreciated that the subscriber terminals physically closer to the headend have an advantage in terms of access to the system. For example, FIG. 1A illustrates the time delays arising because of the distances between a headend X and four subscriber terminals A, B, C, and D of an exemplary cable television system. Because of the distance between the headend X and the subscriber terminal A, transmissions between the subscriber terminal A and the headend X experience a delay of 0.5 milliseconds. Similarly, transmissions between the subscriber terminal B and the headend X experience delays of 1.0 milliseconds, transmissions between the subscriber terminal C and the headend X experience delays of 1.5 milliseconds, and transmissions between the subscriber terminal D and the headend X experience delays of 2.0 milliseconds.

In a cable television system which allots time slots to the subscriber terminals thereof, such transmission delays can cause gaps between the packets of information received at the headend. For example, FIG. 1B is a timing chart illustrating the time slots allotted to the subscriber terminals A-D. It is assumed in FIG. 1B that the time slots are of one millisecond duration and that communication between the subscriber terminals A-D and the headend X occurs without transmission delay. FIG. 1C is a timing chart illustrating the data packets from subscriber terminals A-D as actually received by the headend X. As can be seen from FIG. 1C, gaps of 0.5 millisecond duration between the received data packets result because of the differing transmission delays of the subscriber terminals A-D. Because of these gaps, a substantial amount of unused time along the communication time line results so that transmission is inefficient.

Depending on the order of transmission, such transmission delays can cause the packets of information received at the headend from the subscriber terminals to overlap. For example, FIG. 1D is a timing chart illustrating the time slots allotted to the subscriber terminals A-D such that the subscriber terminal D is allotted a time slot before the subscriber terminal C, the subscriber terminal C is allotted a time slot before the subscriber terminal B, and the subscriber terminal B is allotted a time slot before the subscriber terminal A. As in the case of FIG. 1B, the time slots shown in FIG. 1D assume no transmission delays. FIG. 1E is a timing chart illustrating the impact that the transmissions delays have on the data packets, which are transmitted by the subscriber terminals A-D in these time slots, as received by the headend X. The data packets from the subscriber terminals A-D collide with one another resulting in corruption of information which adversely impacts transmission efficiency of the cable television system.

In those systems which permit spontaneous transmission by the subscriber terminals and rely on contention resolution to avert conflicts, the subscriber terminals closer to the headend have a greater access advantage than subscriber terminals farther from the headend. That is, because of the transmission delays illustrated in FIG. 1A, the subscriber terminals have unequal access over the communication channel to the headend.

The transmission delays discussed above result in reduced system throughput.

OBJECTS OF THE INVENTION

It is therefore a basic object of the present invention to provide an improved communications network.

It is a more specific object of the present invention to provide an improved communications network wherein access over the network is afforded to all stations on an equalized basis for improving data throughput.

It is a further object of the present invention to provide an improved communication network wherein station access is equalized on the basis of transmission delays relative to each station.

BRIEF DESCRIPTION OF THE DRAWINGS

The features and advantages of the present invention will become apparent from a detailed consideration of the invention when taken in conjunction with the drawings in which:

FIG. 2 is a block diagram illustrating a communication system according to the present invention;

FIG. 6 illustrates in greater detail the delay element shown in FIG. 5;

DETAILED DESCRIPTION OF THE INVENTION

Figure 1A:
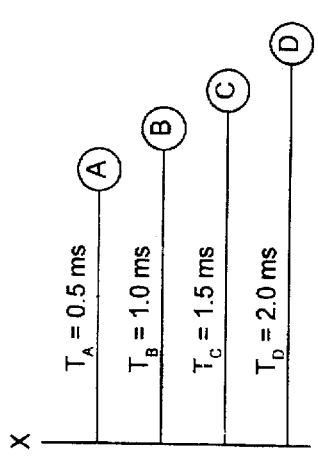
FIGS. 1A, 1B, 1C, 1D and 1E are timing diagrams illustrating reduced data throughput due to transmission delays of a communication system.

A cable television system 200 is illustrated in FIG. 2 and includes a headend 202 and a plurality of subscriber terminals 204 designated as subscriber terminals 204A, 204B, ... 204N. The headend 202 and the subscriber terminals 204 are connected to a common bi-directional communication channel 206 which supports the communication of messages, which may be in the form of data packets, between the headend 202 and the subscriber terminals 204. That is, the headend 202 transmits downstream data to the subscriber terminals 204, and the subscriber terminals 204 transmit upstream data to the headend 202.

The headend 202 includes a data receiver 208 which receives the upstream data transmitted by the subscriber terminals 204 over the bi-directional communication channel 206. The data received by the data receiver 208 is coupled to a network controller 210 which, among other functions, determines a network access delay for each of the subscriber terminals 204 as discussed more fully below. The network controller 210 generates downstream data which is combined with video and audio data by an inserter/modulator 212. The inserter/modulator 212 transmits the combined video, audio, and downstream data from the network controller 210 downstream over the bi-directional communication channel 206 to the subscriber terminals 204.

Figure 3:
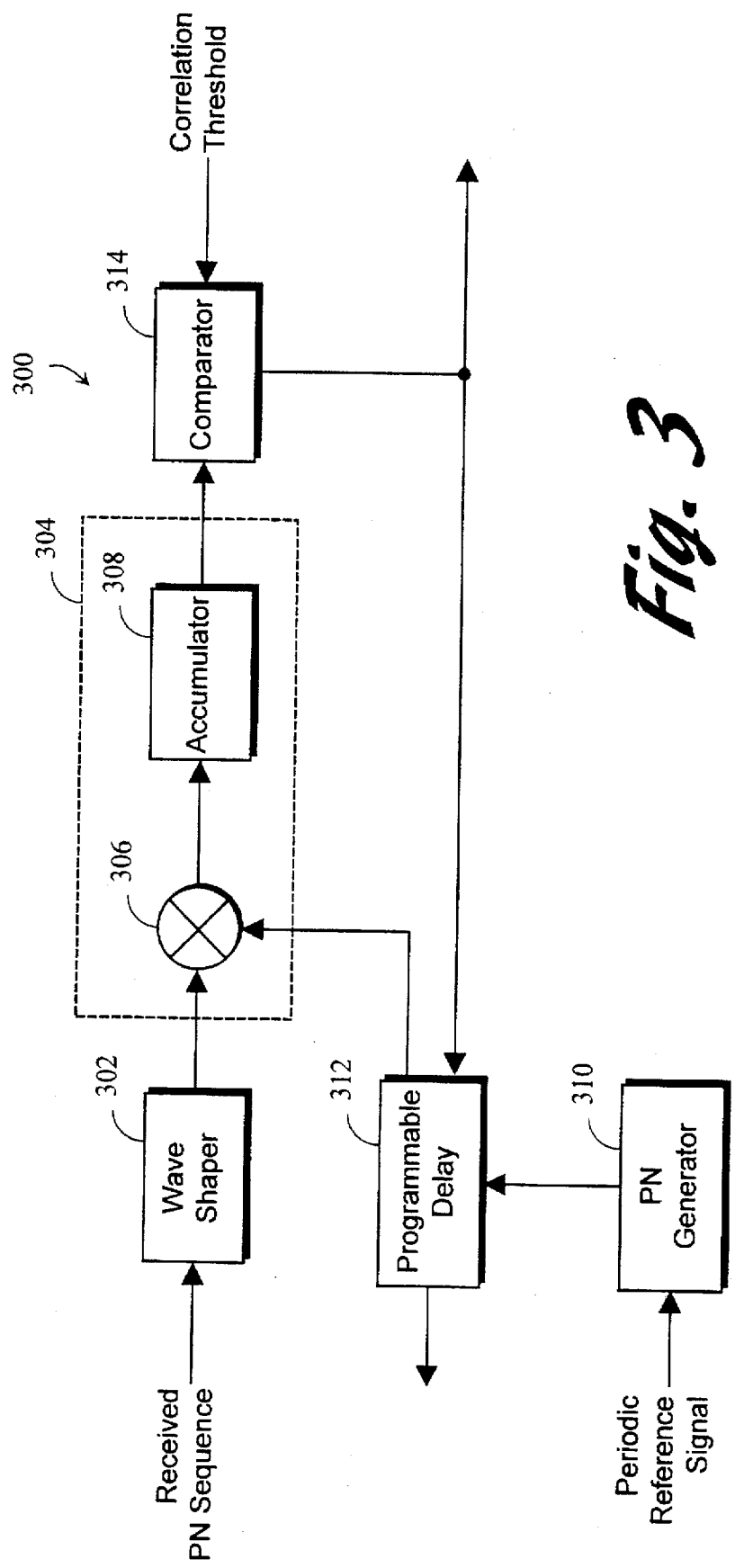
FIG. 3 is a block diagram illustrating a portion of the network controller shown in FIG. 2.

FIG. 3 illustrates that portion of the network controller 210 which is pertinent to the present invention. This portion is illustrated in FIG. 3 as a network access delay determination portion 300 and determines the network access delay for each of the subscriber terminals 204. Initially, the network controller 210 generates a network delay determination initiation data packet and causes the inserter/modulator 212 to transmit this data packet downstream to a first selected one of the subscriber terminals 204. This data packet instructs the first selected subscriber terminal 204 to begin generating, and repetitively transmitting upstream, a subscriber terminal predetermined sequence of symbols. This subscriber terminal predetermined sequence of symbols, for example, may be a pseudorandom number sequence. It is desirable to select a unique pseudorandom sequence, i.e. one that is orthogonal to any other pseudorandom sequence of the same length. The subscriber terminal predetermined sequence of symbols preferably includes a number of symbols (for example, binary bits). The number of symbols in the subscriber terminal predetermined sequence of symbols may be determined by the following expression:

$$\log_2\left(\frac{T_{max}}{T_s}\right), \quad (1)$$

where $T_{max}$ is the maximum anticipated delay throughout the cable television system 200 and $T_s$ is the interval between the symbols of the subscriber terminal predetermined sequence of symbols.

The repetitively transmitted subscriber terminal predetermined sequence of symbols is received by the data receiver 208 of FIG. 2 and is coupled by the data receiver 208 to a wave shaper 302 of FIG. 3. The wave shaper 302 may shape the symbols of the received subscriber terminal predetermined sequences of symbols into pulses of a desired shape. The output of the wave shaper 302 is applied to one input of a correlator 304. The correlator 304 includes a multiplier 306 and an accumulator 308.

A generator 310 is responsive to a periodic timing reference signal for repetitively supplying a local predetermined sequence of symbols to a second input of the correlator 304 by way of a programmable delay circuit 312. Although the local predetermined sequence of symbols may be different from the subscriber terminal predetermined sequence of symbols (for example, due to variations caused by the cable system), the local predetermined sequence of symbols and the subscriber terminal predetermined sequence of symbols are preferably identical. The output of the correlator 304 is applied to a comparator 314 which compares the output from the correlator 304 to a correlation threshold and supplies an output based upon this comparison to the programmable delay circuit 312.

In operation, the programmable delay circuit 312 is initially set to a minimum (for example, zero) delay. Because the subscriber terminal predetermined sequences of symbols and the local predetermined sequences of symbols are asynchronously related, the output of the correlator 304 may reflect anywhere from a minimum to a maximum correlation between the subscriber terminal predetermined sequences of symbols and the local predetermined sequences of symbols. The comparator 314 compares the amount of correlation from the correlator 304 to the correlation threshold and increments the programmable delay circuit 312 while the amount of correlation remains below the correlation threshold. This process is repeated until the local predetermined sequences of symbols generated by the generator 310 and delayed by the programmable delay circuit 312 are brought into optimum synchronism with the subscriber terminal predetermined sequences of symbols received from the first selected subscriber terminal 204 so that a substantially maximum correlation is achieved. The output of the comparator 314 may also be communicated to a processor of the network controller 210 by which the network controller 210 may determine when substantially maximum correlation is achieved.

The amount of delay, $T_{delay}$, to which the programmable delay circuit 312 has been set by the comparator 314 at the time of substantially maximum correlation represents the time required for a data packet transmitted by the first selected subscriber terminal 204 to reach the headend 202 and may be referred to as a synchronization time interval. The programmable delay circuit 312 has an output by which it communicates $T_{delay}$ to a processor of the network controller 210. The network controller 210 determines the network access delay $T_{nad}$ for the first selected subscriber terminal 204 by determining the difference between a reference, such as $T_{max}$, and $T_{delay}$ as follows:

$$T_{nad} = T_{max} - T_{delay}. \quad (2)$$

Thereafter, this network access delay is transmitted downstream to the first selected subscriber terminal 204 by the network controller 210 and is subsequently used as an assigned delay by the first selected subscriber terminal 204 for upstream transmissions.

A similar network access delay is likewise determined in turn for each of the remaining subscriber terminals 204.

Figure 4:
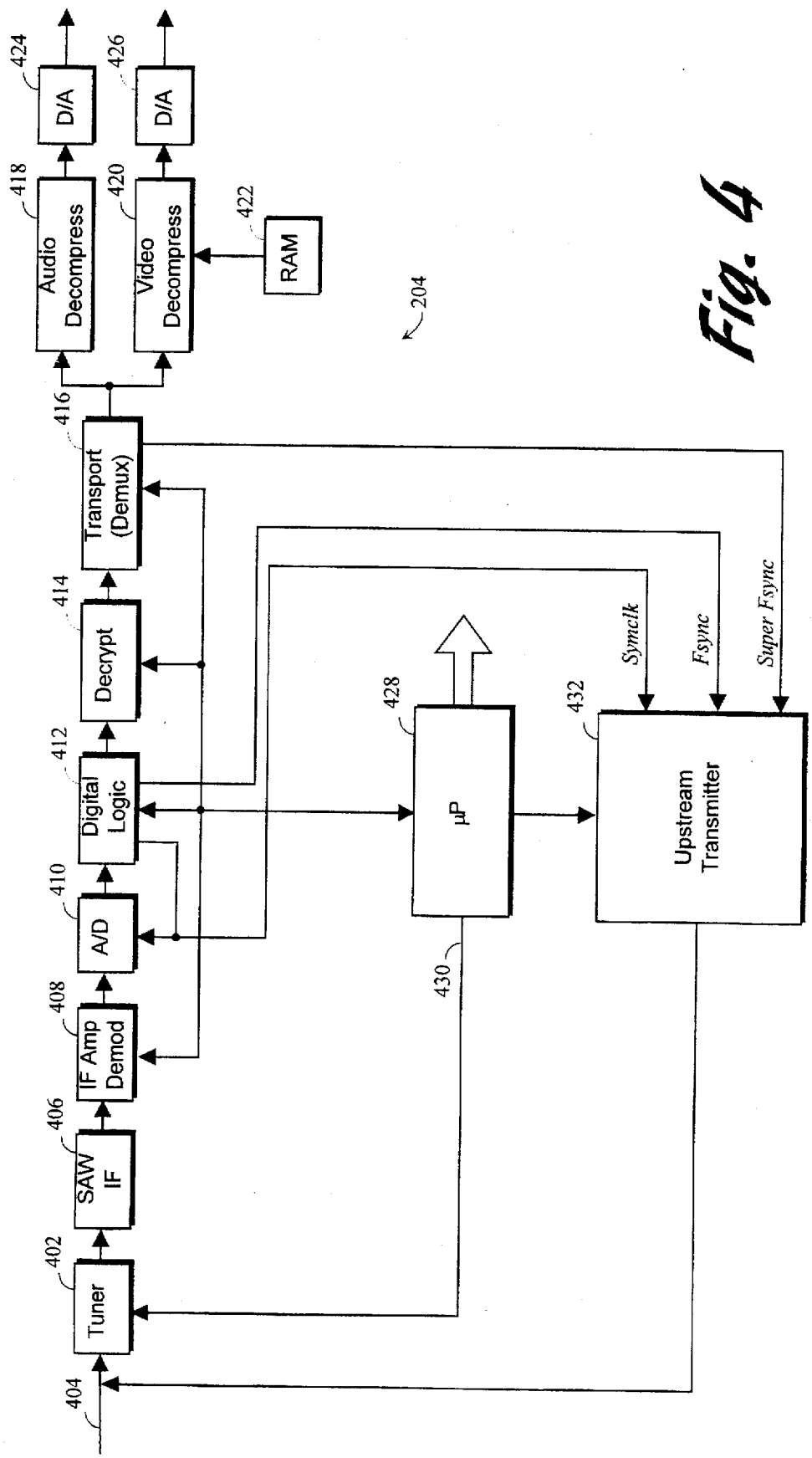
FIG. 4 is a block diagram illustrating an exemplary one of the stations illustrated in FIG. 2.

An exemplary subscriber terminal 204 is illustrated by the block diagram of FIG. 4. The subscriber terminal 204 includes a tuner 402 coupled to the bi-directional communication channel 206 by a cable 404. The output of the tuner 402 is coupled to an intermediate frequency filter 406 which is connected to the input of an intermediate frequency amplifier and demodulator circuit 408. The output of the intermediate frequency amplifier and demodulator circuit 408 is coupled to an analog to digital converter 410, the output of which is coupled to the input of a digital logic circuit 412. A decryption circuit 414 receives the output from the digital logic circuit 412 and is coupled to a transport demultiplexer circuit 416. The output of the transport demultiplexer circuit 416 is coupled to respective audio and video decompression circuits 418 and 420. The video decompression circuit 420 has a random access memory 422 coupled thereto. The output of the audio decompression circuit 418 is coupled to a digital to analog converter 424 which has an output coupled to an audio system. Correspondingly, the output of the video decompression circuit 420 is coupled to a digital to analog converter 426 which has an output coupled to a video display.

The subscriber terminal 204 further includes a microprocessor 428 having a channel selection output 430 coupled to the tuner 402 and having a bi-directional data coupling to the intermediate frequency amplifier and demodulator circuit 408, the digital logic circuit 412, the decryption circuit 414, and the transport demultiplexer circuit 416 (by which downstream data is downloaded to the microprocessor 428. The subscriber terminal 204 also includes an upstream transmitter 432 which includes an input coupled to an output of the microprocessor 428, a symbol clock input coupled from the digital logic circuit 412, a frame sync input also coupled from the digital logic circuit 412, and a super frame synchronization input coupled from the transport demultiplexer circuit 416.

In operation, a plurality of broadcast signals on the bi-directional communication channel 206 are coupled by the cable 404 to the input of the tuner 402 which, in response to a channel selection signal supplied to it by the microprocessor 428, couples a selected one of the broadcast signals to the intermediate frequency filter 406. The intermediate frequency filter 406 may be constructed in accordance with conventional fabrication techniques and may, for example, include a conventional surface acoustic wave filter or its equivalent. The output of the intermediate frequency filter 406 is demodulated by the intermediate frequency amplifier and demodulator circuit 408. The intermediate frequency amplifier and demodulator circuit 408 may be constructed in accordance with conventional fabrication techniques and may, for example, include a synchronous demodulator. The essential function of the intermediate frequency amplifier and demodulator circuit 408 is to recover the base band analog signal modulated upon the carrier selected by the tuner 402. While different transmission signal formats and methods may be utilized in communicating data through a cable television system, one example of such a cable television system utilizes a digital vestigial sideband system in which N-level symbols having a symbol rate of approximately 10.76 MHz are transmitted and received together with a data frame sync signal having a frequency of approximately 41.2 KHz resulting in data frames of approximately 24.3 milliseconds in duration. The demodulated base band analog signal at the output of the intermediate frequency amplifier and demodulator circuit 408 would, therefore, comprise successive N-level symbols equally spaced by the period of the symbol clock signal.

The analog to digital conversion performed by the analog to digital converter 410 is clocked at the symbol clock frequency to accurately recover the amplitudes of each symbol in the form of a multi-bit value. The output of the analog to digital converter 410 is processed by the digital logic circuit 412 to recover the frame synchronization signal "fsync" in synchronism with the received frame and to generate the symbol clock signal "symclk" for operating the analog to digital converter 410. The output data signal from the digital logic circuit 412 typically comprises compressed video and audio information and is further processed by the decryption circuit 414 and thereafter demultiplexed by the transport demultiplexer circuit 416 in order to provide input audio and video signals to the audio and video decompression circuits 418 and 420, respectively. The audio and video decompression circuits 418 and 420 perform conventional audio and video decompression operations upon the applied audio and video data in order to produce decompressed audio and video signals which are converted to corresponding analog signals by the digital to analog converters 424 and 426. These analog signals are thus applied to the audio system and the video display (not shown), respectively.

Furthermore, the plurality of broadcast signals may also contain other subscriber terminal specific information such as a network delay determination initiation data packet modulated onto the carrier selected by channel selection signal supplied by the microprocessor 428 to the tuner 402. The transport demultiplexer 416 recovers the network delay determination initiation data packet and supplies the network delay determination initiation data packet to the microprocessor 428. In response to the network delay determination initiation data packet, the microprocessor 428 causes the upstream transmitter 432 to begin repetitively transmitting the subscriber terminal predetermined sequence of symbols.

Figure 5:
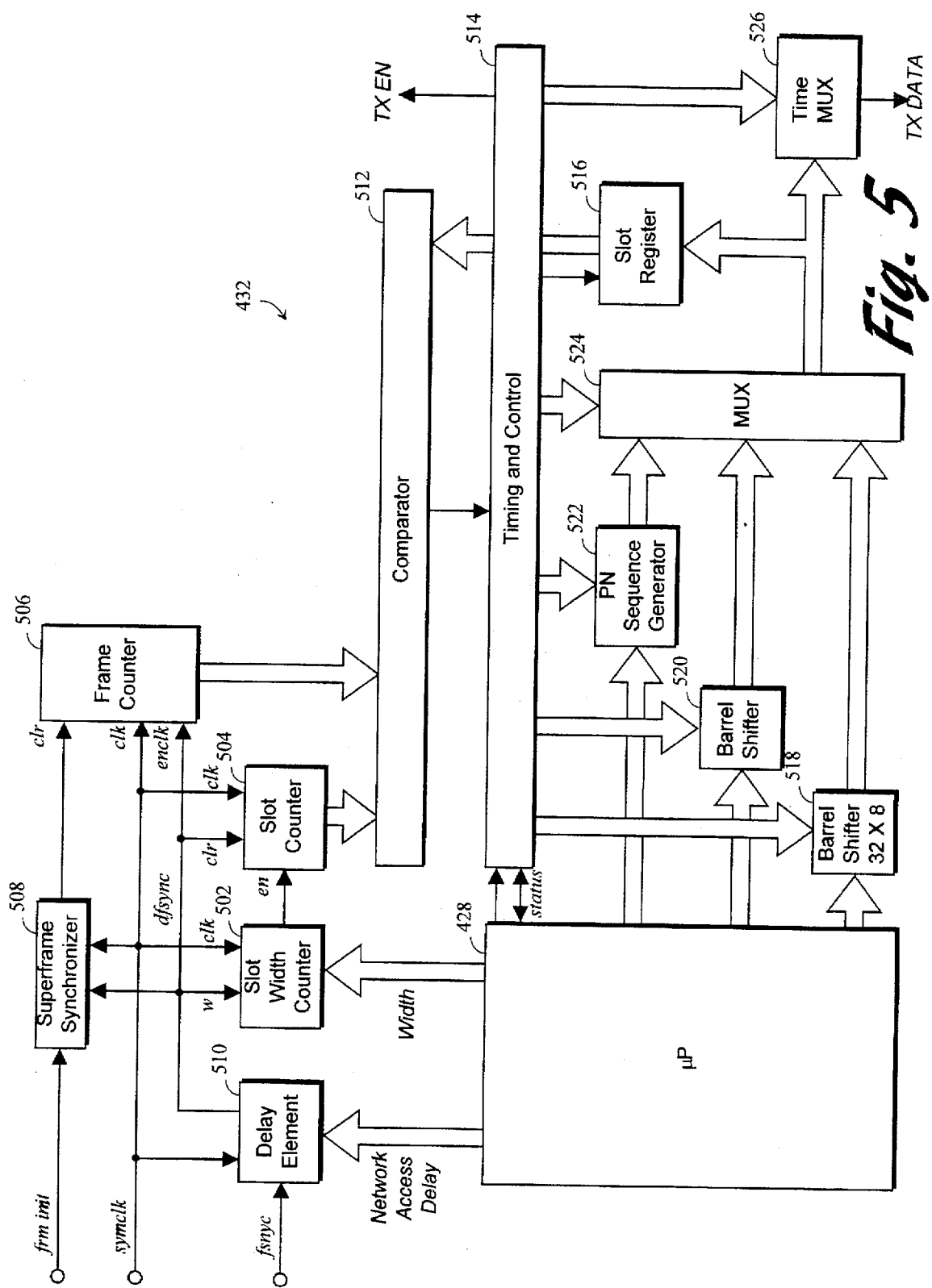
FIG. 5 illustrates in greater detail the upstream transmitter shown in FIG. 4.

The upstream transmitter 432 is shown in greater detail in FIG. 5. The upstream transmitter 432 is coupled to the cable 404 for upstream transmission and operates in response to a symbol clock input and a frame sync signal input from the digital logic circuit 412. The upstream transmitter 432 further responds to a super frame sync signal which is provided by the transport demultiplexer circuit 416.

The microprocessor 428 couples a programmable width signal WIDTH to the upstream transmitter 432. The upstream transmitter 432 utilizes the programmable width signal WIDTH, the super frame sync signal, the symbol clock signal "symclk," and a delayed frame sync signal "dfsync" in order to properly time upstream communication applied to the cable 404 from the subscriber terminal 204 by generating a plurality of message transmission time slots, each of which may be uniquely assigned to a respective subscriber terminal 204 or which may be used as a contention time slot.

The upstream transmitter 432 includes a slot width counter 502 which receives the programmable width signal WIDTH from the microprocessor 428. The slot width counter 502 also receives the symbol clock signal "symclk" and the delayed frame sync signal "dfsync". A slot counter 504 is cleared by the delayed frame sync signal "dfsync," is enabled by an output of the slot width counter 502, and is clocked by the symbol clock signal "symclk." A frame counter 506 is enabled by the delayed frame sync signal "dfsync," is clocked by the symbol clock signal "symclk," and is cleared by the super frame synchronizing signal from a super frame synchronizer 508. A delay element 510 receives from the microprocessor 428 a network access delay, which is stored by the microprocessor 428 and which is unique to the subscriber terminal 204. The delay element 510 is enabled by the frame sync signal "fsync," is clocked by the symbol clock signal "symclk," and provides the delayed frame sync symbol "dfsync" as an output therefrom.

A comparator 512 receives an input from the slot counter 504, receives an input from the frame counter 506, and provides an output to the timing and control circuit 514. The timing and control circuit 514 receives a transmission clock signal from a transmission modulator (not shown) and provides an output to a slot register 516. The timing and control circuit 514 also includes a data input and a status line input from the microprocessor 428. The timing and control circuit 514 provides data and address outputs to memories 518 and 520 and timing signals to a sequence generator 522 which generates and repetitively transmits the subscriber terminal predetermined sequence of symbols to the headend 202. A multiplexer 524 receives inputs from the memories 518 and 520 and from the sequence generator 522 and provides an output to the slot register 516 and to a time multiplexer 526. The microprocessor 428 is also connected to the intermediate frequency amplifier and demodulator circuit 408, the digital logic circuit 412, the decryption circuit 414, and the transport demultiplexer circuit 416 as shown in FIG. 4.

In operation, the microprocessor 428 provides the programmable slot width signal WIDTH to the slot width counter 502 in order to preset the count in the slot width counter 502. The microprocessor 428 also supplies the network access delay to the delay element 510. Upon the next delayed frame sync signal "dfsync" provided by the delay element 510, the slot width counter 502 counts down in response to the symbol clock signal "symclk" from its preset count and produces an output signal when a zero count is obtained. Thereafter, the slot width counter 502 recycles, thereby producing a plurality of successive output signals, each of which corresponds to the time interval in which the slot width counter 502 counts downwardly from the preset count. The succession of outputs from the slot width counter 502 is applied as an enable input to the slot counter 504 which is cleared each time a delayed frame sync signal "dfsync" is applied thereto. The slot counter 504 responds to the applied clock signals from the symbol clock signal "symclk" in order to produce an output count to the comparator 512 synchronously with the symbol clock signal "symclk" which corresponds to the sequentially established time slots created by the slot width counter 502. Thus, the slot counter 504 supplies to the comparator 512 a time slot identifying number. The frame counter 506 receives the delayed frame sync signal "dfsync" at its enabled input in order to produce an output count to the comparator 512 synchronously with the symbol clock signal "symclk."

The output of the slot counter 504 comprises a succession of eight-bit slot identifying numbers occurring within each data frame sync interval. Correspondingly, the output from the frame counter 506 comprises an eight-bit running count identifying each successive frame which has occurred following the previous super frame sync signal. As a result, the combination of eight-bit output counts from the slot counter 504 and from the frame counter 506, when combined, form a 16-bit number which identifies a plurality of periodically recurring time slots coextensive with one or more data frames of the received vestigial sideband signals. Each time slot, therefore, is uniquely identified by the combined number formed by the outputs from the slot counter 504 and the frame counter 506 in which the output of the slot counter 504 forms the eight least significant bits of the time slot identifying number while the output from the frame counter 506 forms the eight most significant bits of the time slot identifying number. This combined number is utilized by the comparator 512 to provide sequential identification of each time slot within each super frame as the vestigial sideband signal is received.

Each subscriber terminal within the cable television system 200 may be assigned one or more unique time slots and/or one or more contention time slots for upstream data transmission. Such assignments are made by downloading one or more time slot numbers to the microprocessor 428 which can be used by the subscriber terminal 204 for upstream transmissions as described in further detail hereinafter. A uniquely assigned time slot (sometimes referred to as a reserved time slot) can, of course, only be used by the respective subscriber terminal and thereby guarantees access to the network. On the other hand, all or a selected combination of subscriber terminals may attempt upstream transmissions during contention time slots. A successful transmission to the headend 202 results in the receipt of an "acknowledge" signal by the transmitting subscriber terminal 204. In the case of an unsuccessful upstream transmission, the message is normally retransmitted during a subsequent contention slot as defined by a so-called "back-off" algorithm which may also be downloaded to the microprocessor 428 by the cable television system 200.

The upstream transmitter 432 initiates upstream data transmission by initially transferring a sixteen-bit time slot identifying number (which may represent either a reserved or a contention time slot) to the memory 518 through the timing and control circuit 514. In transferring the sixteen-bit time slot identifying number to the memory 518, the eight least significant bits and eight most significant bits are preferably loaded into different memory locations to be accessed separately. The remaining memory locations within the memory 518 are filled with the data to be transmitted upstream (which is also transferred to the memory 518 through the timing and control circuit 514).

Thereafter, the eight most significant bits which correspond to the frame identifying portion of the time slot identifying number are coupled from the memory 518 by the multiplexer 524 to the slot register 516. The comparator 512 generates an internal match signal when the eight most significant bits of the time slot identifying number supplied by the slot register 516 match the eight most significant bits from the frame counter 506. In response thereto, the eight least significant bits comprising a time slot identifying number from the memory 518 are coupled through the multiplexer 524 to the slot register 516. The slot register 516 applies the eight least significant bits to the comparator 512. The comparator 512 performs a comparison of the eight least significant bits of the time slot identifying number to the current eight least significant bits from the slot counter 504 and produces an output signal to the timing and control circuit 514 when a match occurs.

In response to this match signal, the timing and control circuit 514 then causes the data stored in the memory 518 to be outputted through the multiplexer 524 to the time multiplexer 526. The time multiplexer 526 converts the data to serial data stream which is applied to a modulator (not shown) thereby forming the transmission data.

To further enhance the effectiveness of the upstream transmitter 432, the memory 520, which may be identical to the memory 518, is coupled to the timing and control circuit 514, to the microprocessor 428, and to the multiplexer 524. The purpose of providing the memory 520 is to utilize an alternating memory access for the timing and control circuit 514 in which one of the memories 518 and 520 may be loaded with data while the other of the memories 518 and 520 is outputting data to transmit upstream. This process improves the effectiveness and throughput capability of the upstream transmitter 432.

When a network delay determination initiation data packet is received by the subscriber terminal 204 from the headend 202 instructing the subscriber terminal 204 to begin generating and repetitively transmitting the subscriber terminal predetermined sequence of symbols, the microprocessor 428 causes the sequence generator 522 to begin repetitively supplying the subscriber terminal predetermined sequence of symbols through the multiplexer 524 to the time multiplexer 526. These subscriber terminal predetermined sequences of symbols are then transmitted over the cable 404 to the bi-directional communication channel 206 and thus to the headend 202. The network access delay determination portion 300 receives the repetitively transmitted subscriber terminal predetermined sequence of symbols and compares the repetitively transmitted subscriber terminal predetermined sequence of symbols to the local predetermined sequence of symbols as discussed above. This local predetermined sequence of symbols is generated by the generator 310 and is incrementally delayed by the programmable delay circuit 312 until the correlation between the subscriber terminal predetermined sequences of symbols and the local predetermined sequences of symbols achieves the correlation threshold.

The headend 202 then uses the total delay, i.e. $T_{delay}$, which was inputted to the programmable delay circuit 312 in order to achieve the desired level of correlation, to compute the network access delay for the subscriber terminal. This network access delay is then transmitted by the headend 202 to that subscriber terminal. Similarly, network access delays are determined for, and are transmitted by the headend 202 to, the other subscriber terminals. The microprocessors 428 of these subscriber terminals use these network access delays as inputs to their corresponding delay elements 510 in order to equalize access between all subscriber terminals to the headend 202 and/or in order eliminate the gap and overlap problems illustrated by FIGS. 1C and 1E.

More detailed explanations of the subscriber terminal 204 shown in FIG. 4, and of the upstream transmitter 432 shown in FIG. 5, are contained in U.S. Pat. No. 5,535,206, the disclosure of which is incorporated herein by reference.

The delay element 510 is shown in more detail in FIG. 6. The frame sync signal "fsync" from the digital logic circuit 412 is applied to a reset input of a flip flop 602. The Q output of the flip flop 602 is applied to a load input of a down counter 604. Both the flip flop 602 and the down counter 604 are clocked by the symbol clock signal "symclk" from the digital logic circuit 412. The network access delay appropriate to the particular subscriber terminal 204 is applied to the down counter 604 in order to jam an initial count therein. An output of the down counter 604 is applied to a decoder such as a zero detector 606. The zero detector 606 provides the delayed frame sync signal "dfsync," which is also fed back to a set input of the flip flop 602.

Accordingly, when the zero detector 606 produces a delayed frame sync signal "dfsync," the zero detector 606 sets the flip flop 602 in order to cause the down counter 604 to load the network access delay. The next frame sync signal "fsync" that is received resets the flip flop 602 which allows the down counter 604 to begin down counting from the network access delay. When the zero detector 606 decodes a zero output from the down counter 604, the zero detector 606 produces the next delayed frame sync signal "dfsync." Thus, the delay element 510 produces delayed frame sync signals "dfsync" determined by the network access delay assigned to the subscriber terminal 204. This network access delay may comprise an integral number of symbol clocks.

Figure 1B:
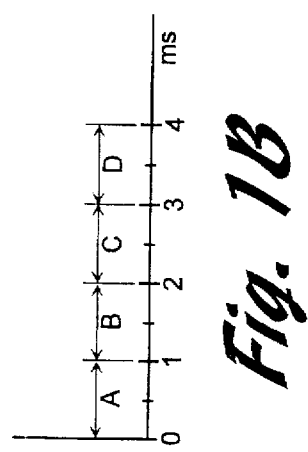
Figure 7:
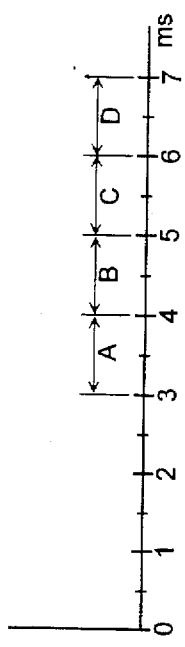
FIG. 7 is a timing diagram illustrating the results of a correction for data transmission delays as implemented by the present invention; and, FIG. 8 is a flow chart depicting a program which may be executed by the network controller in order to determine a network access delay for each of the subscriber terminals shown in FIG. 2.

Accordingly, as shown in FIG. 7, if the subscriber terminals A–D are to transmit in the sequence shown in FIG. 1B, the subscriber terminal A, which would otherwise transmit so that its data, ignoring transmission delays, would be received at the headend X at reference point 0, instead transmits so that its data is received at the headend X at reference point 3. The time between reference point 0 and reference point 3 includes (i) the 0.5 millisecond transmission delay between the beginning of transmission by the subscriber terminal A and the beginning of reception by the headend X, and (ii) a network access delay of 2.5 milliseconds which is computed based upon a difference between a $T_{max}$ of 3 milliseconds and a $T_{delay}$ of 0.5 milliseconds.

The subscriber terminal B, which would otherwise transmit so that its data, ignoring transmission delays, would be received at the headend X at reference point 1, instead transmits so that its data is received at the headend X at reference point 4. The reference point 4 includes (i) the 1.0 millisecond transmission delay between the beginning of transmission by the subscriber terminal B and the beginning of reception by the headend X, (ii) a network access delay of 2.0 milliseconds which is computed based upon a difference between $T_{max}$ and a $T_{delay}$ of 1.0 milliseconds, and (iii) 1.0 milliseconds which represents the length of time of the slot assigned to subscriber terminal A.

The subscriber terminal C, which would otherwise transmit so that its data, ignoring transmission delays, would be received at the headend X at reference point 2, instead transmits so that its data is received at the headend X at reference point 5. The reference point 5 includes (i) the 1.5 millisecond transmission delay between the beginning of transmission by the subscriber terminal C and the beginning of reception by the headend X, (ii) a network access delay of 1.5 milliseconds which is computed based upon a difference between $T_{max}$ and a $T_{delay}$ of 1.5 milliseconds, and (iii) 2.0 milliseconds which represents the length of time of the slots assigned to subscriber terminals A and B.

Figure 1D:
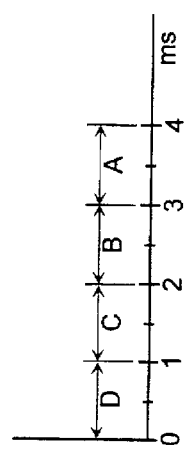
Figure 1C:
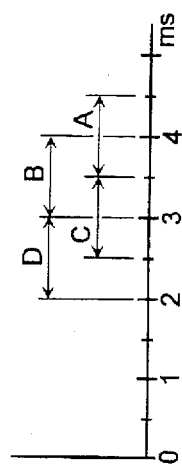
Figure 1E:
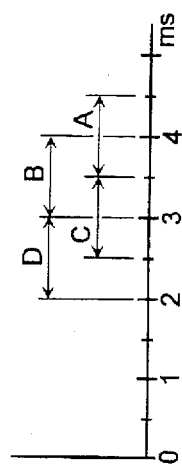

The time slot for subscriber terminal D is similarly determined. Thus, as can be seen by FIG. 7, no gaps exist between the data messages in the time slots A–D as received by the headend X. A similar analysis shows that the overlaps shown FIG. 1D are likewise eliminated.

Figure 8:
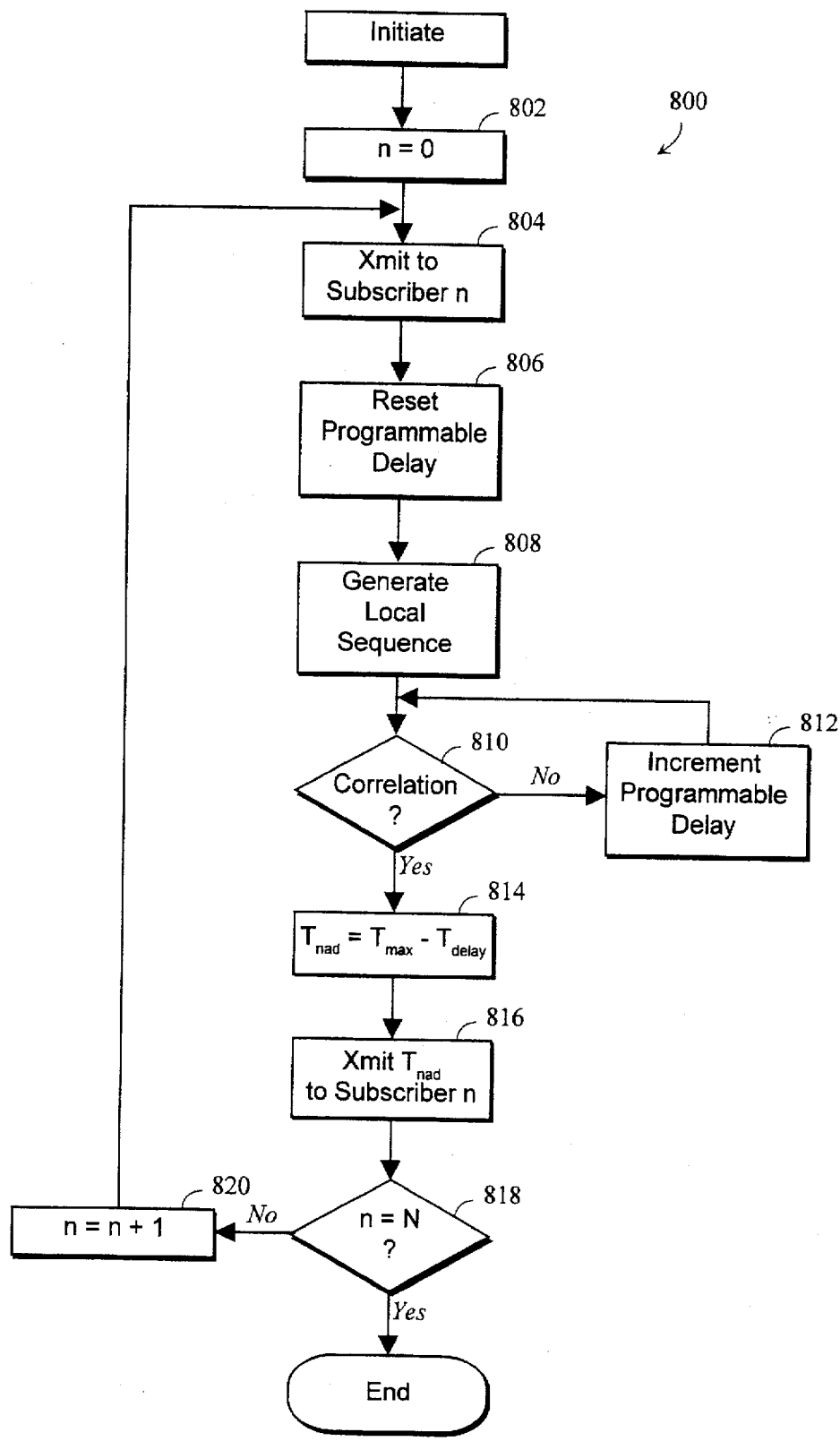

FIG. 8 is a flow chart depicting a program 800 which may be executed by the network controller 210 in order to determine the network access delay for each of the subscriber terminals 204 and to transmit the network access delays to the corresponding subscriber terminals. Upon initiation of the program 800, a block 802 sets a variable n to zero, a block 804 transmits a network delay determination initiation data packet to the subscriber terminal n, and a block 806 resets the programmable delay of the programmable delay circuit 312.

A block 808 supplies the periodic reference signal to the generator 310 causing the generator 310 to begin generating repetitively the local predetermined sequence of symbols. A block 810 samples the output of the comparator 314 in order to determine whether the local predetermined sequence of symbols correlates to a sufficient extent with the subscriber terminal predetermined sequence of symbols received from the subscriber terminal n. If the block 810 does not determine substantial maximum correlation, a block 812 increments the programmable delay of the programmable delay circuit 312. Program flow then returns to the block 810 to again sample the output of the comparator 314 in order to determine whether the local predetermined sequence of symbols correlates to a sufficient extent with the subscriber terminal predetermined sequence of symbols received from the subscriber terminal n.

When the block 810 detects correlation, a block 814 determines the network access delay for the subscriber terminal n in accordance with equation (2). A block 816 transmits the network access delay $T_{nad}$ determined by the block 814 to the subscriber terminal n. A block 818 determines whether the variable n has reached the value of a constant N which is the number of subscriber terminals in the cable television system 200. If the variable n has not reached the constant N, a block 820 increments the variable n by one, and the flow of the program 800 returns to the block 804 in order to determine the network access delay $T_{nad}$ for the next subscriber terminal (i.e., subscriber terminal n+1). When the block 818 detects that network access delays have been determined for all subscriber terminals, the program 800 is ended.

Certain modifications of the present invention have been discussed above. Other modifications will occur to those practicing in the art of the present invention. For example, while the headend has been described as performing the function of determining network access delays for all of the subscriber terminals, one of the subscriber terminals may instead perform this function, or each subscriber function may determine its own network access delay. Also, although the present invention has been described with respect to a cable television system having a headend and a plurality of subscriber terminals, it should be apparent that the present invention may be used in conjunction with other types of data communication systems having a plurality of stations connected in a network such that any one or more stations may be given the network access delay determination functions. Moreover, although the network access delays are disclosed as being determined by a headend or by a subscriber terminal, or by any one or more stations of any data communications system, network access delays may instead be determined by a device in the system dedicated solely to this function. Furthermore, many of the hardware blocks disclosed herein may be implemented in software. All such modifications are considered to be within the scope of the present invention as set out in the claims attached hereto.

What is claimed is:

1. A method for determining a network access delay between first and second stations of a communications network comprising the steps of:

transmitting a first sequence of symbols from the first station to the second station, wherein the first sequence of symbols is different from second and third sequences of symbols;

receiving the first sequence of symbols at the second station and, in response thereto, transmitting the second sequence of symbols from the second station to the first station;

receiving the second sequence of symbols at the first station;

determining a synchronization time interval between the second sequence of symbols and the third sequence of symbols generated at the first station; and, determining the network access delay based upon the synchronization time interval.

2. The method of claim 1 wherein the second and third sequences of symbols are substantially identical.

3. The method of claim 1 wherein the step of determining the synchronization time interval comprises the step of correlating the second and third sequences of symbols.

4. The method of claim 3 wherein the step of determining the synchronization time interval comprises the steps of adjusting the second and third sequences of symbols with respect to one another and determining a point at which the correlation between the second and third sequences of symbols meets a predetermined threshold.

5. The method of claim 4 wherein the step of adjusting the second and third sequences of symbols with respect to one another comprises the step of incrementally delaying the third sequence of symbols.

6. The method of claim 5 wherein the step of determining the network access delay comprises to step of determining a difference between the synchronization time interval and a reference, and wherein the reference is equal to or greater than a maximum network delay.

7. The method of claim 5 wherein the second and third sequences of symbols are substantially identical.

8. The method of claim 5 wherein the second and third sequences of symbols comprise corresponding numbers of symbols, and wherein the numbers of symbols are dependent upon a maximum anticipated network delay and a symbol interval.

9. A communications network comprising:

a plurality of stations interconnected by a communication channel;

access delay interval determining means connected to the communications channel for determining an access delay interval for each of the plurality of stations by ascertaining a corresponding access time interval between a station data packet received from each of the plurality of stations and a local data packet at a point of predetermined correlation between the station data packets and the local data packet, wherein the access delay interval determining means includes a correlator for providing a correlation output based upon a correlation between the station data packet received from each of the plurality of stations and the local data packet, and a comparator for comparing the correlation output to a predetermined correlation threshold; and, transmitting means at each of the plurality of stations for transmitting data packets at a time based upon the corresponding access time interval.

10. The communications network of claim 9 wherein the station data packets and the local data packets are substantially identical.

11. The communications network of claim 9 wherein the access delay interval determining means comprises means for adjusting the station data packets and the local data packet with respect to one another and for determining a point at which correlation between the station data packets and the local data packet meets the predetermined threshold.

12. The communications network of claim 11 wherein the access delay interval determining means comprises means for incrementally delaying the local data packet.

13. The communications network of claim 12 wherein the access delay interval determining means comprises means for determining the access delay interval by ascertaining a difference between the time interval associated with each of the plurality of stations and a reference which is equal to or greater than a network access delay of a station which is farthest from the access delay interval determining means.

14. The communications network of claim 12 wherein the station data packets and the local data packets are substantially identical.

15. The communications network of claim 12 wherein the station data packets and the local data packets comprise corresponding numbers of symbols, and wherein the numbers of symbols are dependent upon a maximum anticipated network delay and a symbol interval.

16. The communications network of claim 9 wherein the transmitting means at each of the plurality of stations comprises a counter having the access delay interval of its corresponding station as an input.

17. The communications network of claim 16 wherein the station data packets comprise symbols, and wherein the counter at the transmitting means at each of the plurality of stations receives a symbol clock signal as another input.

18. The communications network of claim 17 wherein the station data packets are transmitted in frames, and wherein the counter at the transmitting means at each of the plurality of stations has a frame synchronization signal as another input.

19. The communications network of claim 18 wherein the counter of the transmitting means at each of the plurality of stations has an output means for triggering transmission of data packets by corresponding stations.

20. The communications network of claim 19 wherein the station data packets and the local data packet are substantially identical.

21. The communications network of claim 19 wherein the access delay interval determining means comprises means for adjusting the station data packets and the local data packets with respect to one another and for determining a point at which correlation between the station data packets and the local data packets meets the predetermined threshold.

22. The communications network of claim 21 wherein the access delay interval determining means comprises means for incrementally delaying the local data packet.

23. The communications network of claim 22 wherein the access delay interval determining means comprises means for determining the access delay interval by ascertaining a difference between the time interval associated with each of the plurality of stations and a reference which is equal to or greater than a network access delay of a station which is farthest from the access delay interval determining means.

24. The communications network of claim 22 wherein the station data packets and the local data packets are substantially identical.

25. The communications network of claim 22 wherein the station data packets and the local data packets comprise corresponding numbers of symbols, and wherein the numbers of symbols are dependent upon a maximum anticipated network delay and a symbol interval.

26. A method for determining first and second network access delays between first, second, and third stations of a communications network comprising the steps of:

transmitting a first sequence of symbols from the first station to the second station;

receiving the first sequence of symbols at the second station and, in response thereto, transmitting a second sequence of symbols from the second station to the first station;

receiving the second sequence of symbols at the first station;

determining a first synchronization time interval between the second sequence of symbols and a third sequence of symbols generated at the first station;

determining the first network access delay based upon the first synchronization time interval;

transmitting a fourth sequence of symbols from the first station to the third station;

receiving the fourth sequence of symbols at the third station and, in response thereto, transmitting a fifth sequence of symbols from the third station to the first station, wherein the second and fifth sequence of symbols are different and are orthogonal to one another;

receiving the fifth sequence of symbols at the first station;

determining a second synchronization time interval between the fifth sequence of symbols and a sixth sequence of symbols generated at the first station; and, determining the second network access delay based upon the second synchronization time interval.

27. The method of claim 26 wherein the second, third, fifth, and sixth sequences of symbols are substantially identical.

28. The method of claim 26 wherein the step of determining the first synchronization time interval comprises the step of correlating the second and third sequences of symbols, and wherein the step of determining the second synchronization time interval comprises the step of correlating the fifth and sixth sequences of symbols.

29. The method of claim 28 wherein the step of determining the first synchronization time interval comprises the steps of adjusting the second and third sequences of symbols with respect to one another and determining a point at which correlation between the second and third sequences of symbols meets a predetermined threshold, and wherein the step of determining the second synchronization time interval comprises the steps of adjusting the fifth and sixth sequences of symbols with respect to one another and determining a point at which correlation between the fifth and sixth sequences of symbols meets a predetermined threshold.

30. The method of claim 29 wherein the step of adjusting the second and third sequences of symbols with respect to one another comprises the step of incrementally delaying the third sequence of symbols, and wherein the step of adjusting the fifth and sixth sequences of symbols with respect to one another comprises the step of incrementally delaying the sixth sequence of symbols.

31. The method of claim 30 wherein the first network access delay is determined as a difference between a first reference and the first synchronization time interval, wherein the second network access delay is determined as a difference between a second reference and the second synchronization time interval, and wherein the first and second references are equal to or greater than a maximum network access delay.

32. The method of claim 30 wherein the second, third, fifth, and sixth sequences of symbols are substantially identical.

33. The method of claim 30 wherein the second and third sequences of symbols comprise corresponding numbers of symbols, wherein the numbers of symbols of the second and third sequences of symbols are dependent upon a maximum anticipated network delay and a symbol interval, wherein the fifth and sixth sequences of symbols comprise corresponding numbers of symbols, and wherein the numbers of symbols of the fifth and sixth sequences of symbols are dependent upon a maximum anticipated network delay and a symbol interval.

34. The method of claim 26 wherein the second and third sequences of symbols are substantially identical, and wherein the fifth and sixth sequence of symbols are substantially identical.

35. A station for communicating with other stations in a communication network comprising:

receiving means for receiving a communication from another station of the communication network, wherein the communication includes a synchronization time interval and a synchronization initiating signal;

transmitting means, responsive to the synchronization initiating signal, for transmitting one of a plurality of synchronization determining signals, wherein the synchronization determining signals are orthogonal to one another; and, storing means for storing the synchronization time interval, wherein the transmitting means uses the synchronization time interval to synchronize the transmission of data.

36. The station of claim 35 wherein the one of the plurality of synchronization determining signals comprises a sequence of symbols, wherein the number of symbols in the sequence of symbols is substantially equal to $\log_2(T_{max}/T_s)$, wherein $T_{max}$ is a maximum anticipated delay throughout the communication network, and wherein $T_s$ is an interval between symbols of the sequence of symbols.

37. The station of claim 35 wherein the one of the plurality of synchronization determining signals is a pseudorandom signal.

38. A station for communicating with other stations in a communication network comprising:

transmitting means for transmitting a first sequence of symbols arranged to initiate a synchronization determining interval;

receiving means for receiving a second sequence of symbols from another station of the communication network;

correlating means for correlating the second sequence of symbols to a third sequence of symbols and for providing a correlation output based upon a correlation between the second and third sequences of symbols;

comparing means for comparing the correlation output to a predetermined correlation threshold; and, wherein the transmitting means is arranged to transmit an access delay interval based upon the comparison of the correlation output to the predetermined correlation threshold.

39. The station of claim 38 wherein the number of symbols in each of the second and third sequences of symbols is substantially equal to $\log_2(T_{max}/T_s)$, wherein $T_{max}$ is a maximum anticipated delay throughout the communication network, and wherein $T_s$ is an interval between symbols of each of the second and third sequences of symbols.

40. The station of claim 38 wherein the first sequence of symbols is different from the second and third sequences of symbols.

* * * * *